United States Patent
Wen (10) Patent No.: US 7,953,147 B1
(45) Date of Patent: May 31, 2011

(54) ITERATION BASED METHOD AND/OR APPARATUS FOR OFFLINE HIGH QUALITY ENCODING OF MULTIMEDIA CONTENT

(75) Inventor: Jiangtao Wen, La Jolla, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1479 days.

(21) Appl. No.: 11/334,247

(22) Filed: Jan. 18, 2006

(51) Int. Cl.
*H04N 7/12* (2006.01)

(52) U.S. Cl. .................................. 375/240.03

(58) Field of Classification Search . 374/240.02–240.16
See application file for complete search history.

(56) References Cited

U.S. PATENT DOCUMENTS

| | | | |
|---|---|---|---|
| 5,771,357 A * | 6/1998 | Kato et al. ................ | 709/247 |
| 6,363,113 B1 * | 3/2002 | Faryar et al. ............ | 375/240.03 |
| 6,496,538 B1 * | 12/2002 | Drysdale ................ | 375/240.16 |
| 6,560,282 B2 * | 5/2003 | Tahara et al. ............ | 375/240.02 |
| 7,734,106 B1 * | 6/2010 | Zhang et al. ............ | 382/239 |
| 2002/0018565 A1 * | 2/2002 | Luttrell et al. ............ | 380/217 |
| 2002/0034256 A1 * | 3/2002 | Talluri et al. ............ | 375/240.27 |
| 2006/0133478 A1 * | 6/2006 | Wen ...................... | 375/240.03 |
| 2006/0227868 A1 * | 10/2006 | Chen et al. ............ | 375/240.03 |
| 2007/0183495 A1 * | 8/2007 | Kim ...................... | 375/240.1 |

OTHER PUBLICATIONS

Le et al., Iterative-Parametric Image Models for Video Coding, IEEE Signal Processing and Its Applications: 8th International Symposium on Signal Processing and Its Applications, Aug. 2005, pp. 50-53.*

* cited by examiner

*Primary Examiner* — Chieh M Fan
*Assistant Examiner* — Jaison Joseph
(74) *Attorney, Agent, or Firm* — North Weber & Baugh LLP (57) ABSTRACT

A method for encoding video, comprising the steps of (A) encoding a number of frames of a video signal using a first sub-set of encoding parameters, (B) analyzing the encoded frames to find and mark reference frames that are used more than a predetermined number of times, and (C) re-encoding the video signal using a second sub-set of encoding parameters different than the first sub-set of encoding parameters when re-encoding the marked reference frames.

20 Claims, 5 Drawing Sheets

ITERATION BASED METHOD AND/OR APPARATUS FOR OFFLINE HIGH QUALITY ENCODING OF MULTIMEDIA CONTENT

FIELD OF THE INVENTION

The present invention relates to video processing generally and, more particularly, to an iteration based method and/or apparatus for offline high quality encoding of multimedia content.

BACKGROUND OF THE INVENTION

Conventional systems use a large volume of data for multimedia content storage. Such a large volume necessitates high quality content compression. Multimedia compression systems usually employ predictive coding to maximize the compression ratio. Additionally, due to the sheer amount of data that needs to be processed, the content is usually divided into smaller pieces. In particular, a sliding window of digital audio samples for spectral analysis and 16×16 non-overlapping macroblocks of pixels for video coding are often used. The smaller pieces are analyzed and compressed separately during compression.

Predictive coding techniques have been implemented that are capable of achieving an improved compression ratio and lower complexity. The introduction of such predictive coding techniques and the division of the input establish long term and highly complicated dependencies between divisions of the input signal. In MPEG and H.26x video coding, motion estimation is performed to find a best match between a reference known to both the encoder, the decoder, and the current input. As a result, given the same bitrate budget to be spent on the input, the quality of the coded representation is highly dependent on (i) which reference was used and (ii) how the reference was compressed and reconstructed.

Given the overall bitrate budget, the encoder should allocate more bits to portions of the input that are referenced more in subsequently encoded portions, to an extent proportional to the amount of the reference. However, due to complexity concerns, multimedia content are usually encoded in a temporally linear manner where the coded representation of the referenced portions would have to be determined prior to the time the encoder establishes the reference dependencies between the referenced and the referencing portions.

Some advanced encoding systems attempt to alleviate the non-optimal situation by jointly optimizing the encoding of portions of the input signal (i.e., encoding two consecutive frames jointly in the case of video coding). Because of the complicated and long term dependencies between the coded representations of portions, conventional practical joint optimization based optimal encoding systems have to make a compromise and can only consider a small fraction of the potential dependencies that need to be taken into account. The complexity of such conventional systems tends to grow exponentially with regard to the amount of portions and dependencies that are considered.

It would be desirable to implement an iteration based method and/or apparatus for offline high quality encoding of multimedia content.

SUMMARY OF THE INVENTION

The present invention concerns a method for encoding video, comprising the steps of (A) encoding a number of frames of a video signal using a first sub-set of encoding parameters, (B) analyzing the encoded frames to find and mark reference frames that are used more than a predetermined number of times, and (C) re-encoding the video signal using a second sub-set of encoding parameters different than the first sub-set of encoding parameters when re-encoding the marked reference frames.

The objects, features and advantages of the present invention include providing a video encoding system that may (i) provide an iteration-based encoding system, (ii) provide forward/backward iterations during encoding, (iii) be implemented with a small sliding window and/or (v) provide efficient encoding.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
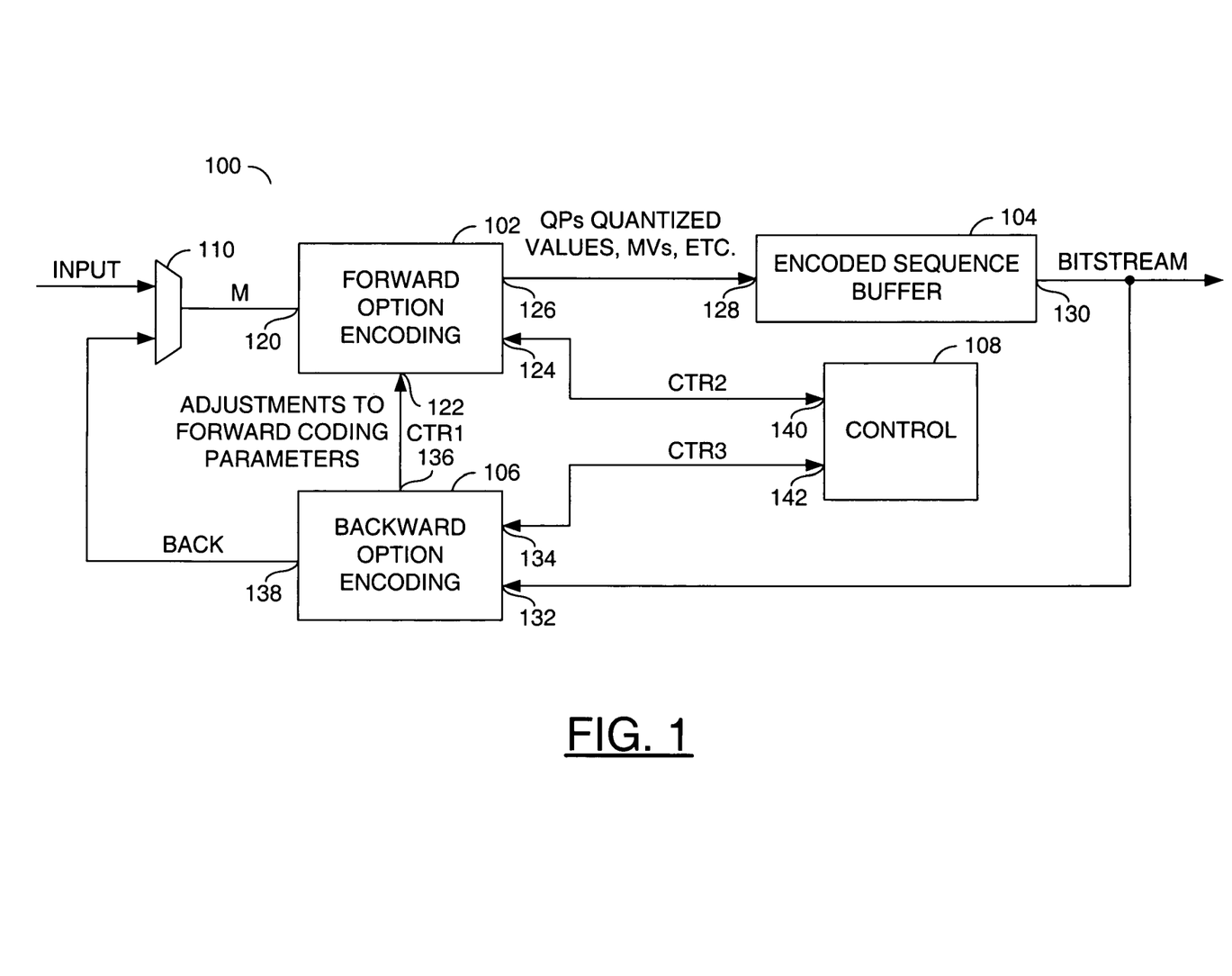
FIG. 1 is a block diagram of a video system.

Referring to FIG. 1, a block diagram of a video system 100 is shown in accordance with a preferred embodiment of the present invention. The video system 100 generally comprises a block (or circuit) 102, a block (or circuit) 104, a block (or circuit) 106, and a block (or circuit) 108. The circuit 102 may be implemented as a forward option encoding circuit. The circuit 104 may be implemented as an encoded sequence buffer. The circuit 106 may be implemented as a backward option encoding circuit. The circuit 108 may be implemented as a control circuit. The system 100 may also include a selection circuit 110. The selection circuit 110 may be implemented as a multiplexer or other appropriate selection circuit.

A video input signal (e.g., INPUT) may be presented to a first input of the multiplexer 110. The signal INPUT may be a video signal comprising a series of frames. A second input of the multiplexer may receive a signal (e.g., BACK) from the circuit 106. The circuit 102 may have an input 120 that may receive a signal (e.g., M) from the multiplexer 110, an input 122 that may receive a signal (e.g., CTR1) from the circuit 106, an input/output 124 that may present and/or receive a signal (e.g., CTR2) from the control circuit 108 and an output 126 that may present one or more encoding parameters to an input 128 of the circuit 104. The encoding parameters may include quantization parameters, quantized values, motion vectors, etc. The circuit 104 may also have an output 130 that may present a signal (e.g., BITSTREAM). The circuit 106 may have an input 132 that may receive the signal BITSTREAM, an input/output 134 that may present and/or receive a signal (e.g., CTR3) from the control circuit 108, an output 136 that may present the signal CTR1 and an output 138 that may present the signal BACK. The control circuit 108 may have an input/output 140 that may present and/or receive a control signal CTR2 and an input/output 142 that may present and/or receive the control signal CTR3. The signal CTR1, the signal CTR2 and the signal CTR3 may be implemented as control signals.

Figure 2:
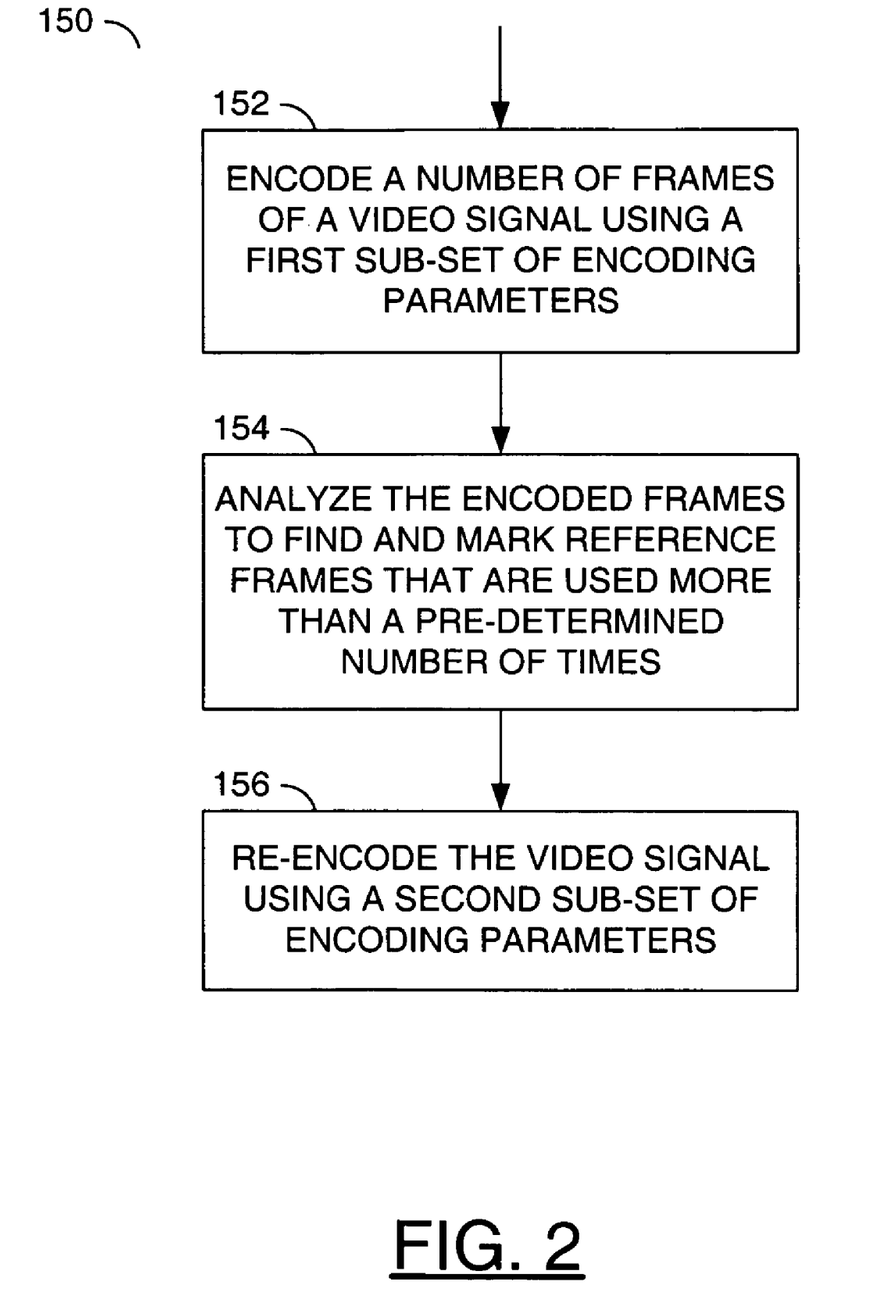
FIG. 2 is a flow diagram of the present invention.

Referring to FIG. 2, a method 150 is shown implementing an example of the operation of the present invention. The method 150 generally comprises a state (or step) 152, a state (or step) 154 and a state (or step) 156. The state 152 may encode a number of frames of the video signal INPUT using a first sub-set of encoding parameters. The step 154 may analyze the encoded frames to find and mark reference frames that are used more than a predetermined number of times. The step 156 may re-encode the video signal using a second sub-set of encoding parameters. The method 150 illustrates an example of the operation of the control block 108. The steps 152-156 are generally implemented in the control block 108. In one example, the steps 152-156 may be implemented using software. In another example, the steps 152-156 may be implemented using discrete and/or programmable logic gates.

Figure 3:
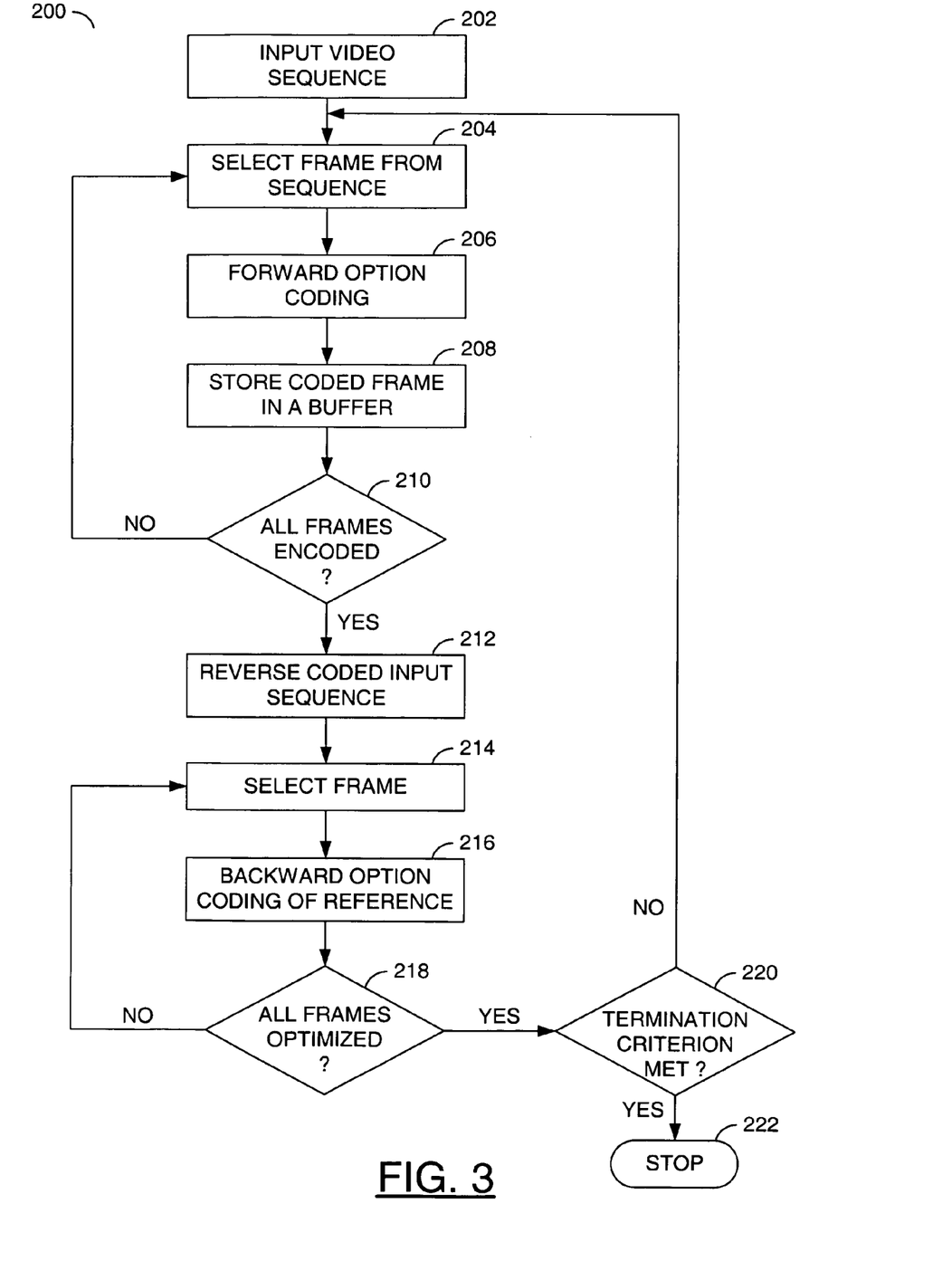
FIG. 3 is a more detailed flow diagram of the present invention.

Referring to FIG. 3, a method 200 is shown implementing an example of the present invention. The method 200 generally comprises a state (or step) 202, a state (or step) 204, a state (or step) 206, a state (or step) 208, a decision state (or step) 210, a state (or step) 212, a state (or step) 214, a state (or step) 216, a decision state (or step) 218, a decision state (or step) 220 and a state (or step) 222. The state 202 generally receives an input signal (e.g., the signal INPUT). The state 204 may select a particular frame from the sequence of frames within the signal INPUT. The state 206 may implement forward option coding (to be described in more detail in connection with FIG. 4). The state 208 may store the coded frame in a buffer. The state 210 may determine if all of the frames of the signal INPUT have been encoded. If not, the method 200 moves back to the state 204. If all the frames have been encoded, the method 200 moves to the state 212. The state 212 performs reverse coded input sequencing. Next, the state 214 selects a frame. Next, the state 216 implements backward option coding of the reference frames (to be described in more detail in connection with FIG. 5). Next, the state 218 determines if all the frames have been optimized. If not, the method 200 moves back to the state 214. If so, the method 200 moves to the state 220. The state 220 determines if one or more termination criterion have been met. If not, the method 200 moves back to the state 204. If so, the method 200 ends at a state 222.

Figure 4:
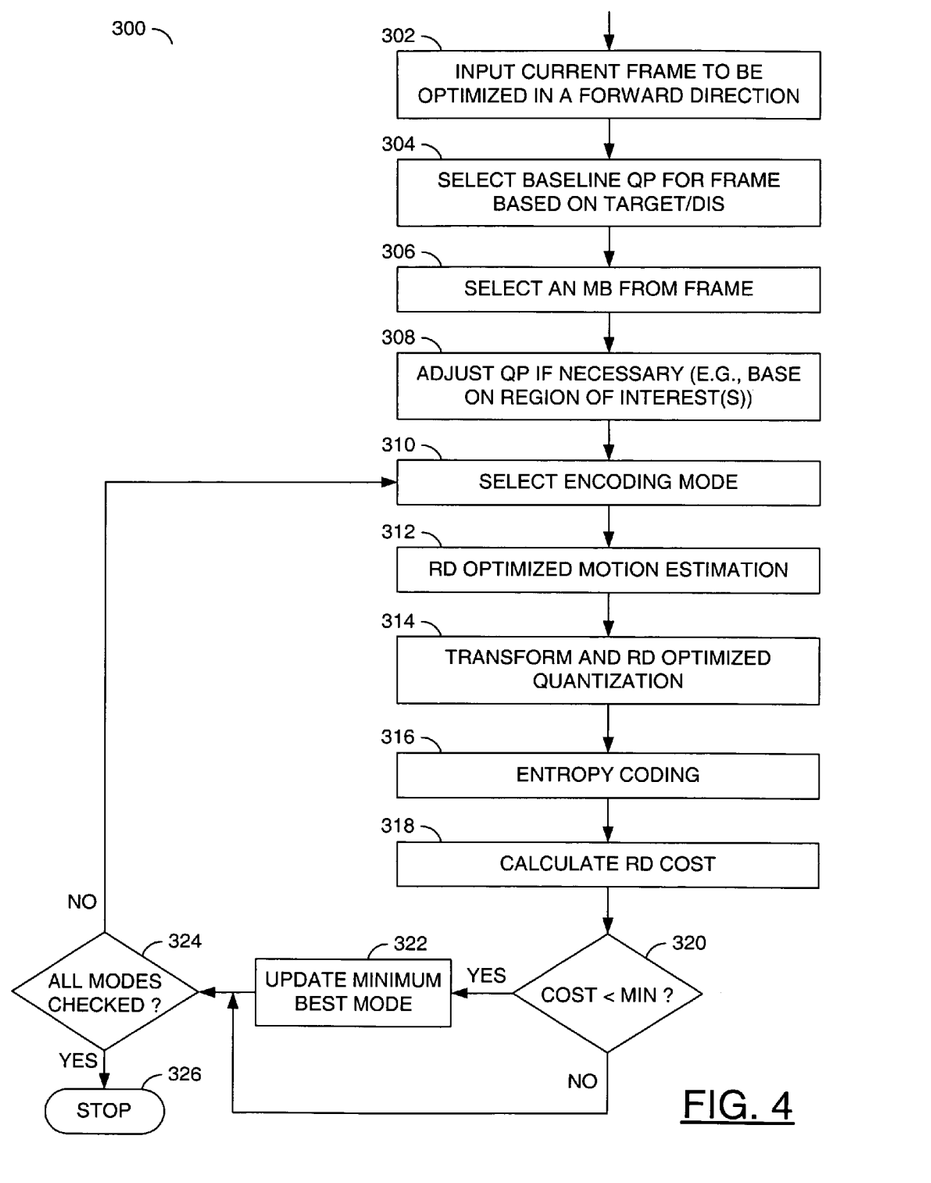
FIG. 4 is a flow diagram illustrating an example of forward option encoding.

Referring to FIG. 4, a method 300 is shown implementing an example of forward option encoding. The method 300 generally comprises a state 302, a state (or step) 304, a state (or step) 306, a state (or step) 308, a state (or step) 310, a state (or step) 312, a state (or step) 314, a state (or step) 316, a state (or step) 318, a decision state (or step) 320, a state (or step) 322, a decision state (or step) 324 and a state (or step) 326. The state 302 receives an input of a current frame to be optimized in a forward direction. Next, the state 304 selects a base line quantization parameter (QP) for each frame based on a target rate. Next, the state 306 selects a macroblock from the frame. Next, the state 308 adjusts one or more quantization parameters (QPs) if necessary, for example, based on regions of interest. Next, the state 310 selects an encoding mode. In some applications, the selection of QPs may happen after the selection of the current encode mode chosen and/or motion estimation, compensation, and transform operations. Next, the state 312 provides a rate distortion motion estimation. Next, the state 314 provides a transformed and rate distorted optimized quantization. Next, the state 316 provides entropy coding. Next, the state 318 calculates a rate distortion cost. Next, the state 320 determines whether the rate distortion cost is less than a minimum cost. If so, the method 300 moves to the state 322. If not, the method 300 moves to the decision state 324. The state 322 updates the minimum best mode. The state 324 determines whether all modes have been checked. If not, the method 300 moves back to the state 310. If so, the method 300 moves to the state 326 and the method ends.

Figure 5:
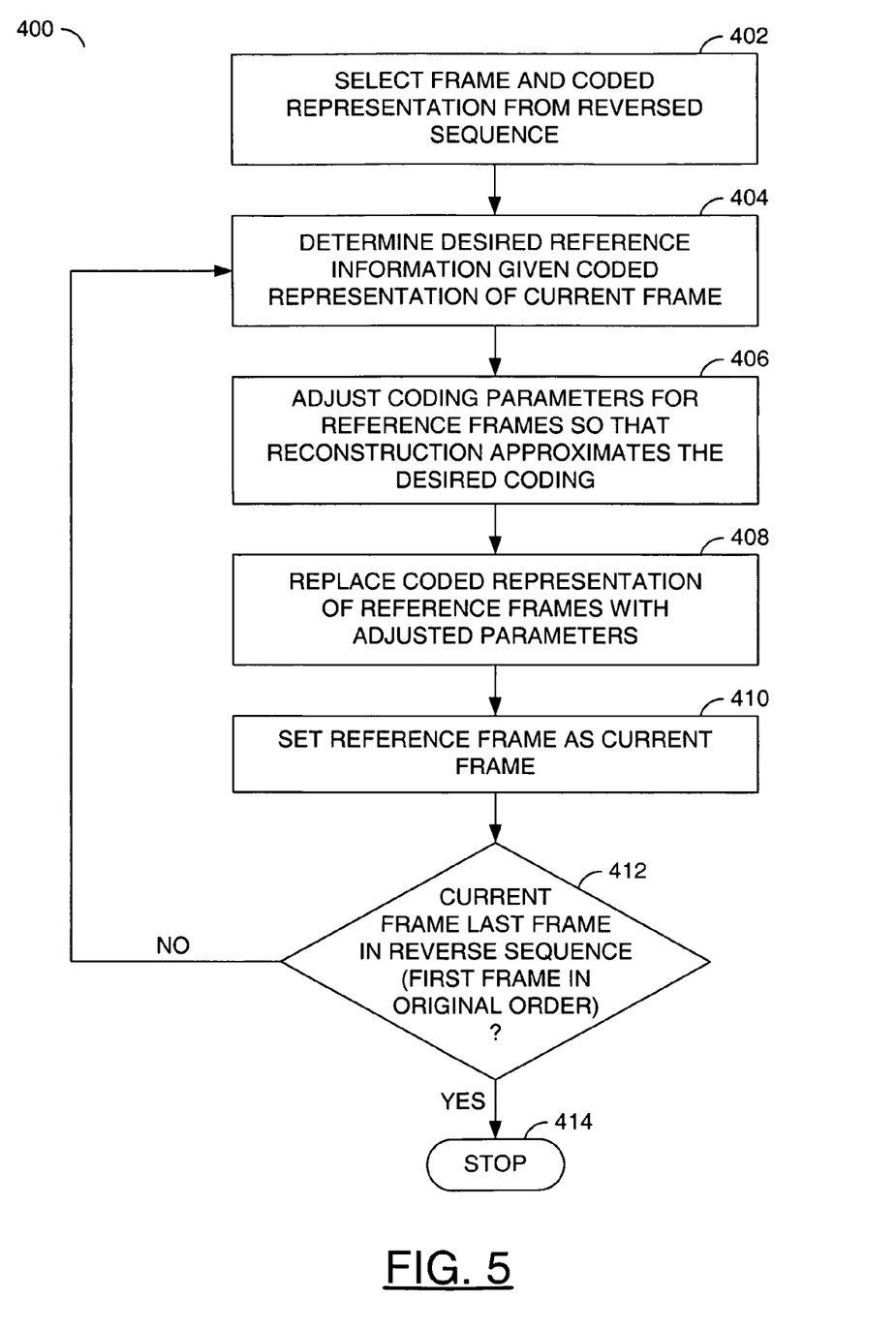
FIG. 5 is a flow diagram illustrating an example of backward option encoding.

Referring to FIG. 5, a method 400 is shown implementing an example of backward option encoding. The method 400 generally comprises a state 402, a state (or step) 404, a state (or step) 406, a state (or step) 408, a state (or step) 410, a decision state (or step) 412 and a state (or step) 414. The state 402 selects a frame and coded representation from a reversed sequence. Next, the state 404 determines whether a desired reference information based on a coded representation of the current frame. Next, the state 406 adjusts coding parameters for reference frames so that construction is approximately a desired coding. Next, the state 408 replaces the coded representation of reference frames with adjusted parameters. Next, the state 410 sets a reference frame as a current frame. Next, the state 412 determines whether a current frame is a last frame in a reverse sequence. For example, the current frame is checked to determine if the first frame is the first frame in the original order. If not, the method moves back to the state 404. If so, the method moves to the state 414.

The present invention may be used for encoding multimedia content in an optimized way. The present invention may maintain a complexity that is close to a linear (or a polynomial function) of the number of dependencies or portions considered. The present invention may provide a method (or process) for implementing a forward-backward iteration encoding technique. The process of the present invention may be suitable for offline encoding of multimedia content.

In general, the forward and backward directions are designated based on the reference structure. The direction is determined based on the referenced portions of the input compared with the referencing portions of the forward direction encoded bitstream and the backward direction encoded bitstream.

Referring back to FIG. 1, the forward direction encoding circuit 102 may operate as a system that optimizes individual components of multimedia encoding (e.g., optimized motion estimation and quantization of DCT coefficients in the rate-distortion (RD) sense for video coding). The forward direction encoding circuit 102 finds a rate distortion optimized coded representation of the input based on the already coded parts of the content.

The backward option decoding circuit 106 operates on the signal BITSTREAM after the entire content has been encoded by the forward direction encoding circuit 102. The backward encoding circuit 106 normally finds the most suitable coded representation of each reference in response to the coded representation of the frames referencing each reference frame.

After the entire content of the signal INPUT has been processed, the forward encoding circuit 102 encodes the signal INPUT again so that the coded representation of the referencing portions may be improved based on the improved reference frames learned from the original encoding. The backward encoding circuit 106 may then encode again. The forward and backward encoding operations are alternated until a preset criteria is met (e.g., the coded representation stabilizes, a preset number of iterations have been finished, etc.).

In one example, the present invention may implement video coding under the MPEG/H.26x framework. In such an example, the forward encoding involves finding the RD optimal coding mode, motion vector and then quantization (quantization parameter and quantized values) of the current frame based on coded presentation of the reference frames. In the backward direction, the present invention searches for the RD optimal quantization given the coding mode, motion vector of the referencing frames. The process is repeated until a predetermined criteria is met. While an MPEG/H.26x implementation has been described, other encoding techniques may be used to meet the design criteria of a particular implementation.

Using the forward-backward iteration encoding described, long dependencies between particular portions of the encoded signal may be taken into account by the trickling down effect of each iteration. Each iteration may also introduce control "instability" into the encoding process so that the encoder becomes less likely to be "trapped" by local optimals that are often problematic for traditional unidirectional optimized encoding. The complexity of the present system grows linearly with respect to the length of the sequence and the number of iterations, as opposed to exponentially as in the conventional case when the number of jointly considered frames increases.

In each iteration the present invention may (i) perform single-MB-based mode RD-decision, (ii) optimize mode choice changes during iteration, and (iii) converge to a global decision. Selection of quantization parameters for each macroblock may be based on rate distortion considerations, subject to a restriction on the overall bitrate.

In the forward optimization, each macroblock may fix the quantization parameters and search for mode. Motion vectors and quantization levels may be selected to minimize the average distortion between the original and the reconstructed pixels. In the backward optimization, for each pixel in a frame the desired value for pixels in the reference frame may be determined in response to the compressed information (e.g., mode, MV, QP, CBP, etc.) The prediction may be determined based on the original and the residual pixels. Pixels in the reference frame may be referenced different number of times. In one example, the average of the expectations should be used. In another example, the contributions of the expectations may be weighted by their relative visual importance to the reconstructed image. The present invention may also take into account the original values for the pixels in the reference frame.

The function performed by the flow diagrams of FIGS. 2-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for encoding video, comprising the steps of:
   (A) Encoding a number of frames of a video signal using a first sub-set of encoding parameters;
   (B) Analyzing said encoded frames to find and mark reference frames that are used more than a predetermined number of times; and
   (C) Re-encoding said video signal using a second sub-set of encoding parameters different than said first sun-set of encoding parameters when re-encoding said marked reference frames.

2. The method according to claim 1, further comprises:
   repeating steps (A)-(C) until a predetermined criteria is met.

3. The method according to claim 1, wherein said first sub-set of encoding parameters and said second sub-set of encoding parameters are adjusted for each frame.

4. The method according to claim 1, wherein said first sub-set of encoding parameters includes quantization parameters.

5. The method according to claim 1, wherein said second sub-set of encoding parameters includes selecting an encoding mode.

6. The method according to claim 5, wherein said encoding mode is selected from the group consisting of Inter, Intra bi-directional prediction, direct prediction and Skip.

7. The method according to claim 1, further comprising the step of:
   archiving said re-encoded video signal.

8. The method according to claim 1, wherein steps (A)-(C) are performed on a scene of a video signal.

9. The method according to claim 5, wherein steps (A)-(C) are repeated for a subsequent scene of said video signal.

10. The method according to claim 1, wherein steps (A)-(C) are performed on a group of pictures of a video signal.

11. The method according to claim 5, wherein steps (A)-(C) are repeated for a subsequent group of pictures of said video signal.

12. The method according to claim 1, wherein step (A) comprises the sub-steps of:
   (i) Performing motion estimation for each frame in the input sequence and each encoding mode;
   (ii) Evaluating the quality of the encoded frames when each mode is selected; and
   (iii) Selecting the mode that leads to the best coded representation for the frame, and repeating (i)-(iii) until all the frames in the input sequence has been processed.

13. The method according to claim 1, wherein step (B) comprises the sub-steps of:
   (i) evaluating every frame in the sequence for the number of times each reconstructed pixel in a coded frames has been referenced; and
   (ii) adjusting the encoding parameter for each encoding partition in the current frame so that the reconstruction of the current frame when encoded with the first sub-set of parameters is as close to the values determined in step (i).

14. The method according to claim 1, wherein said method is implemented in an MPEG/H.26x video encoder.

15. An apparatus for encoding video comprising:
   means for encoding a number of frames of a video signal using a first sub-set of encoding parameters.
   means for re-encoding said video signal using a second sub-set of encoding parameters different than said first sub-set of encoding parameters when re-encoding said marked reference frames.

16. An apparatus comprising:
- a first circuit configured to encode frames of a video signal using a first sub-set of encoding parameters;
- a second circuit configured to buffer said encoded frames;
- a third circuit configured to analyze said encoded frames to find and mark reference frames that are used more than a predetermined number of times; and
- a fourth circuit configured to re-encode said video signal using a second sub-set of encoding parameters different than said first set of encoding parameters.

17. The apparatus according to claim 16, wherein (i) said first circuit repeats said encoding based on an updated first sub-set of encoding parameters adjusted based on said fourth circuit re-encoding said video signal and (ii) said first circuit and said fourth circuit are configured to alternate encoding and re-encoding until a predetermined criteria is met.

18. The apparatus according to claim 16, further comprising archiving said re-encoded video signal.

19. The apparatus according to claim 16, wherein said apparatus comprises a video encoder system.

20. A non-transitory computer readable medium configured to execute the steps of claim 1.

* * * * *

UNITED STATES PATENT AND TRADEMARK OFFICE
CERTIFICATE OF CORRECTION

PATENT NO.       : 7,953,147 B1
APPLICATION NO.  : 11/334247
DATED            : May 31, 2011
INVENTOR(S)      : Jiangtao Wen It is certified that error appears in the above-identified patent and that said Letters Patent is hereby corrected as shown below:

Column 6, Line 9        Delete "sun-set" and insert -- sub-set --

Signed and Sealed this
First Day of May, 2012

David J. Kappos
*Director of the United States Patent and Trademark Office*